United States Patent
Sandstrom et al.

(10) Patent No.: US 9,283,817 B2
(45) Date of Patent: Mar. 15, 2016

(54) STIFFNESS ENHANCED TREAD

(75) Inventors: Paul Harry Sandstrom, Cuyahoga Falls, OH (US); Robert Neal Lipcsik, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 951 days.

(21) Appl. No.: 13/302,328

(22) Filed: Nov. 22, 2011

(65) Prior Publication Data

US 2013/0126059 A1    May 23, 2013

(51) Int. Cl.
*B60C 11/00*    (2006.01)
*B60C 19/08*    (2006.01)
*B60C 11/04*    (2006.01)

(52) U.S. Cl.
CPC ............. *B60C 19/082* (2013.04); *B60C 11/005* (2013.01); *B60C 11/0058* (2013.04); *B60C 11/04* (2013.01); *B60C 2011/0025* (2013.04); *B60C 2011/0348* (2013.04)

(58) Field of Classification Search
CPC ................ B60C 19/082; B60C 11/005; B60C 2011/0025; B60C 11/0058
See application file for complete search history.

(56) References Cited

U.S. PATENT DOCUMENTS

| | | | |
|---|---|---|---|
| 3,759,306 A | 9/1973 | Greiner et al. | |
| 4,257,468 A | 3/1981 | Ogawa et al. | |
| 4,274,462 A | 6/1981 | Ogawa et al. | |
| 4,319,620 A | 3/1982 | Knill | |
| 4,385,653 A | 5/1983 | Okazaki et al. | |
| 4,463,146 A | 7/1984 | Donbar et al. | |
| 4,790,365 A | 12/1988 | Sandstrom et al. | |
| 4,905,747 A | 3/1990 | Ogawa | |
| 5,011,896 A | 4/1991 | Bell et al. | |
| 5,091,467 A | 2/1992 | Beers | |
| 5,115,849 A | 5/1992 | Corner | |
| 5,307,850 A | 5/1994 | Halasa et al. | |
| 5,871,601 A | 2/1999 | Tsuda | |
| 5,942,069 A * | 8/1999 | Gerresheim et al. | 156/128.1 |
| 5,986,026 A | 11/1999 | Wong et al. | |
| 6,269,854 B1 * | 8/2001 | Matsuo et al. | 152/152.1 |
| 6,286,575 B1 | 9/2001 | Nakamura | |

(Continued)

FOREIGN PATENT DOCUMENTS

| | | |
|---|---|---|
| CN | 1765963 A | 5/2006 |
| CN | 101168340 A | 4/2008 |

(Continued)

OTHER PUBLICATIONS

Machine translation for Japan 2000-079805 (no. date).*

(Continued)

*Primary Examiner* — Steven D Maki
(74) *Attorney, Agent, or Firm* — Robert N. Lipcsik

(57) ABSTRACT

A pneumatic tire includes a tread base comprised of a first material, a tread cap comprised of a second material, and a ring comprised of a third material. The tread cap is disposed radially outward of the tread base and in operational contact with a ground surface. The ring is disposed at least partially within the tread cap and extends radially away from the tread base. The ring has a stiffness in the radial direction greater than stiffnesses in the circumferential and lateral directions. The third material has a substantially lower hysteresis than the second material during operation of the pneumatic tire. The third material further provides an electrical conductivity path to the ground surface.

9 Claims, 2 Drawing Sheets

(56) References Cited

U.S. PATENT DOCUMENTS

| | | | |
|---|---|---|---|
| 6,415,833 B1 * | 7/2002 | Komatsu | 152/152.1 |
| 6,439,283 B1 | 8/2002 | Paonessa et al. | |
| 6,463,973 B1 | 10/2002 | Tsumori | |
| 6,528,588 B2 | 3/2003 | Luo | |
| 6,719,025 B2 | 4/2004 | Caretta et al. | |
| 6,720,397 B2 | 4/2004 | Luo | |
| 6,746,227 B2 | 6/2004 | Helle et al. | |
| 6,956,093 B1 | 10/2005 | Hsu et al. | |
| 7,131,474 B2 | 11/2006 | Sandstrom | |
| 7,188,651 B2 | 3/2007 | Suzuki | |
| 7,311,128 B2 | 12/2007 | Bruant et al. | |
| 7,334,618 B2 | 2/2008 | Suzuki | |
| 7,789,117 B2 | 9/2010 | Puhala et al. | |
| 7,819,152 B2 | 10/2010 | Marriott et al. | |
| 2005/0045258 A1 | 3/2005 | Suzuki | |
| 2006/0207701 A1 | 9/2006 | Tanaka | |
| 2007/0017617 A1 | 1/2007 | Lafrique et al. | |
| 2007/0187013 A1 * | 8/2007 | Losi et al. | 152/209.5 |
| 2008/0066840 A1 | 3/2008 | Sandstrom et al. | |
| 2008/0216930 A1 | 9/2008 | Valentine et al. | |
| 2008/0216941 A1 * | 9/2008 | Lacagnina et al. | 156/110.1 |
| 2009/0242091 A1 * | 10/2009 | Puhala et al. | 152/209.5 |
| 2010/0078103 A1 * | 4/2010 | Nakamura | B60C 19/08 152/152.1 |
| 2010/0084071 A1 | 4/2010 | Sandstrom | |
| 2010/0256258 A1 | 10/2010 | Miyazaki | |
| 2012/0132330 A1 * | 5/2012 | Sandstrom | 152/209.5 |
| 2013/0048167 A1 * | 2/2013 | De Monte et al. | 152/152.1 |

FOREIGN PATENT DOCUMENTS

| | | | |
|---|---|---|---|
| EP | 320215 A2 * | 6/1989 | |
| EP | 658452 A1 * | 6/1995 | |
| EP | 0658452 A1 | 6/1995 | |
| EP | 747243 A1 * | 12/1996 | |
| EP | 0881060 A2 | 12/1998 | |
| EP | 1859966 A1 | 11/2007 | |
| JP | 60-061312 A * | 9/1985 | |
| JP | 61211106 A1 | 9/1986 | |
| JP | H1139107 A | 5/1999 | |
| JP | 2000-079805 A * | 3/2000 | |
| JP | 2001-105510 A * | 4/2001 | |
| JP | 2004306769 A | 11/2004 | |
| JP | 2005-255048 | 9/2005 | |
| JP | 2010222004 A | 10/2010 | |
| WO | 2005/063509 A1 | 7/2005 | |

OTHER PUBLICATIONS

Machine translation for Japan 2001-105510 (no. date).*
Chinese Search Report, dated Sep. 6, 2014.
EPO Search Report dated Mar. 28, 2013.
U.S. Appl. No. 12/956,204, filed Nov. 30, 2010.

* cited by examiner

STIFFNESS ENHANCED TREAD

FIELD OF INVENTION

This invention generally relates to methods and apparatuses concerning pneumatic tires and more specifically to methods and apparatuses concerning a pneumatic tire having a tread with an annular ring or rings of a low hysteresis/high stiffness material extending through a higher hysteresis/lower stiffness material.

DESCRIPTION OF THE RELATED ART

It is known to those of skill in the art that the overall performance of a pneumatic tire's tread pattern (including performance criteria such as wet handling, dry handling and stopping) may be compromised by the stiffness characteristics of the tread elements. Known methods of increasing the stiffness of a tread element include using relatively stiffer tread base materials and using relatively stiffer tread cap materials. These methods typically have the disadvantage, however, of compromising other tread performance criteria.

It is also known to provide a tire tread having sectors formed with a first material having a first modulus of elasticity and other sectors formed with a second material having a second modulus of elasticity. What is needed is a method of increasing the stiffness characteristics of portions of a tire tread while minimizing the known performance disadvantages.

SUMMARY OF THE INVENTION

A pneumatic tire in accordance with the present invention includes a tread base comprised of a first material, a tread cap comprised of a second material, and a ring comprised of a third material. The tread cap is disposed radially outward of the tread base and in operational contact with a ground surface. The ring is disposed at least partially within the tread cap and extends radially away from the tread base. The ring has a stiffness in the radial direction greater than stiffnesses in the circumferential and lateral directions. The third material has a substantially lower hysteresis than the second material during operation of the pneumatic tire.

According to another aspect of the present invention, the ring is disposed in a shoulder portion of the tread cap for decreasing rolling resistance of the pneumatic tire.

According to still another aspect of the present invention, the third material has a substantially higher modulus of elasticity than the second material.

According to yet another aspect of the present invention, the third material has a substantially higher modulus of elasticity than the first material.

According to still another aspect of the present invention, the third material is a metal.

According to yet another aspect of the present invention, the third material is a polymer.

According to still another aspect of the present invention, the third material is a syndiotactic polybutadiene polymer.

According to yet another aspect of the present invention, the tread cap, the tread base, and the ring are cured simultaneously.

According to still another aspect of the present invention, the third material has a dynamic loss modulus of between 1000 KPa and 8000 KPa.

According to yet another aspect of the present invention, the third material has a dynamic loss modulus of between 1500 KPa and 5000 KPa.

According to still another aspect of the present invention, the second material has a dynamic loss modulus of between 250 KPa and 3000 KPa.

According to yet another aspect of the present invention, the second material has a dynamic loss modulus of between 500 KPa and 2500 KPa.

According to still another aspect of the present invention, the difference between the dynamic loss moduli of the third material and the second material is greater than 500 KPa.

According to yet another aspect of the present invention, the difference between the dynamic loss moduli of the third material and the second material is greater than 1000 KPa.

Another tire in accordance with the present invention includes a carcass and a tread having a tread base formed of a first material, a tread cap formed of a second material having a substantially different stiffness property than the first material, and a ring formed of a third material having a substantially different stiffness property than the first material. The ring extends from the tread base through the tread cap to a ground contacting surface of the tread.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DEFINITIONS

Figure 1:
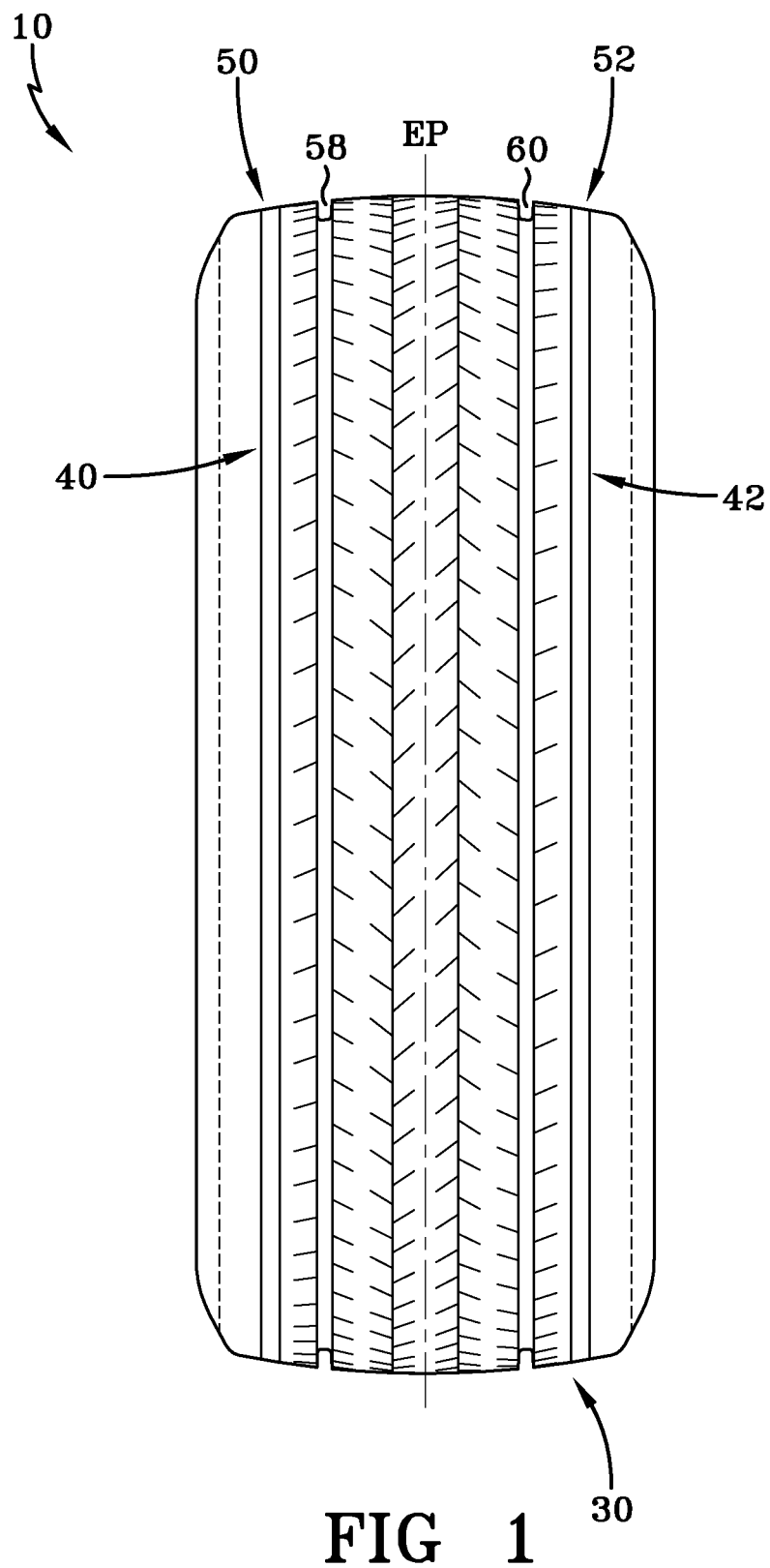
FIG. 1 is a front elevation of an example tire constructed in accordance with the present invention.

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Gauge" refers generally to a measurement, and specifically to a thickness measurement.

"High Tensile Steel (HT)" means a carbon steel with a tensile strength of at least 3400 MPa @ 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa @ 0.20 mm filament diameter.

"Normal Load" means the specific design inflation pressure and load assigned by the appropriate standards organization for the service condition for the tire.

"Normal Tensile Steel (NT)" means a carbon steel with a tensile strength of at least 2800 MPa @ 0.20 mm filament diameter.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa @ 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa @ 0.20 mm filament diameter.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

DETAILED DESCRIPTION OF THE INVENTION

Figure 2:
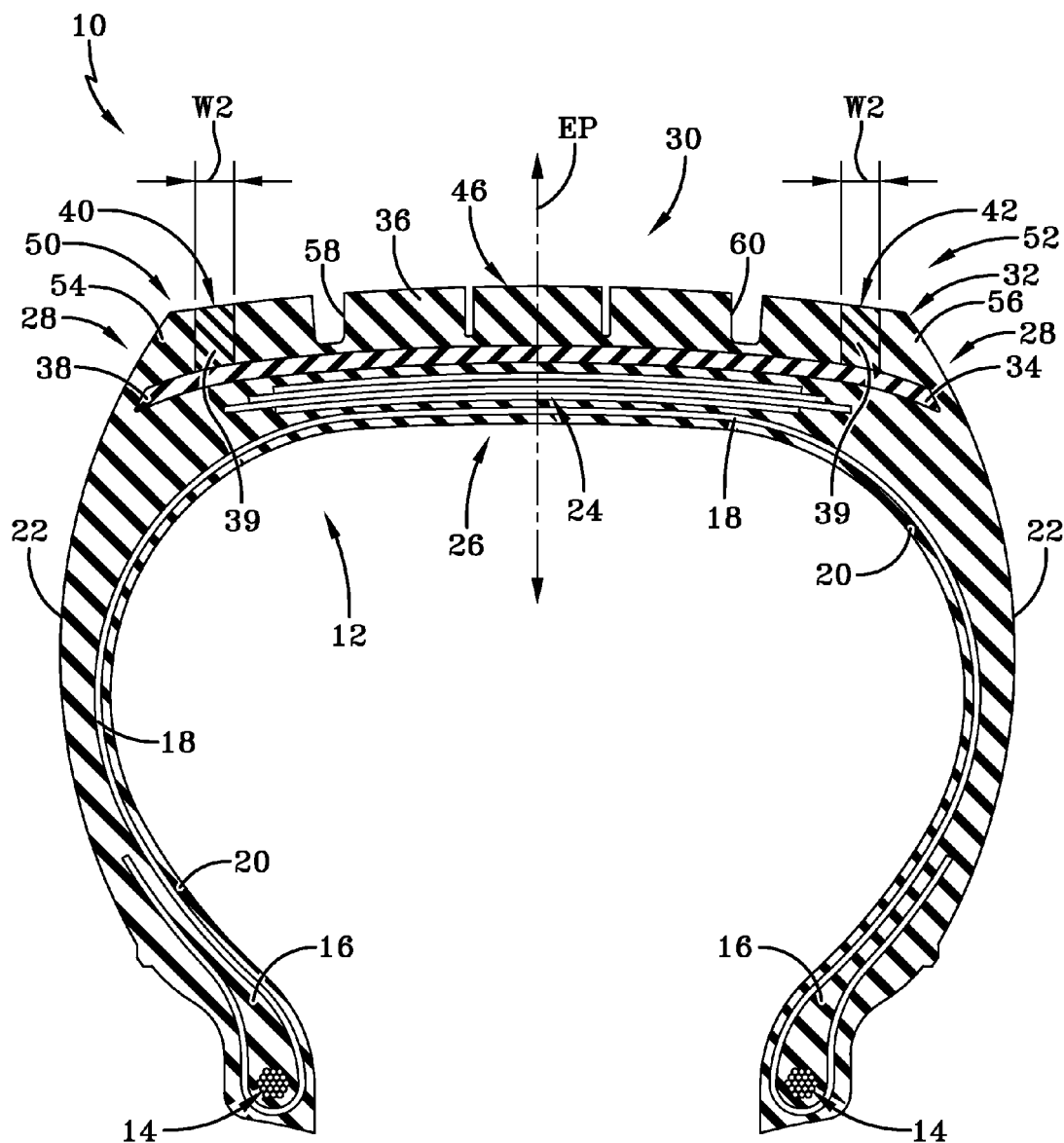
FIG. 2 is a partial cross-section of the example tire of FIG. 1.

Referring now to the drawings wherein the showings are for purposes of illustrating embodiments of the present invention only and not for purposes of limiting the same, and wherein like reference numerals are understood to refer to like components, FIGS. 1 & 2 show a pneumatic tire 10 having an example tread 30 in accordance with the present invention. The example tread 30 may be positioned onto an example carcass 12. The example carcass 12 may include a pair of first and second annular beads 14 and a pair of apexes 16 positioned radially above the first and second annular beads 14. The example carcass 12 may include one or more plies 18 that may extend around the beads 14. The example carcass 12 may further define a crown region 26 and a pair of sidewalls 28. The carcass 12 may include other components, such as an inner liner 20, sidewall rubber portions 22, and a belt package 24.

The example tire tread 30 is shown in its cured and finished state in FIGS. 1 & 2. The tread 30 may have a tread cap 32 formed of a first material 36 and a tread base 34 formed of a second material 38. The first material 36 may have a stiffness property (modulus of elasticity) substantially different than the second material 38. The second material 38 may have a substantially higher stiffness property than the first material 36. The tread 30 may have a first annular ring 40 of a third material 39 that extends circumferentially around the tire 10 and radially from the tread base 34 through the tread cap 32 to an outer ground contacting surface 46 of the tread. The tread 30 may also have a second annular ring 42 of the third material 39 (or alternatively a fourth different material) that extends circumferentially around the tire 10 and radially from the tread base 34 through the tread cap 32 to the outer ground contacting surface 46 of the tread. The first ring 40 may be positioned in a first shoulder 50 of the tread 30 and the second ring 42 may be positioned in a second shoulder 52 of the tread.

The stiffness of the shoulders 50, 52 may be adjusted so as to affect several tire performance characteristics. While the plugs rings 40, 42 are shown positioned within tread elements 54, 56, the rings may also be positioned in other parts of the tread 30, such as grooves 58, 60 in FIGS. 1 & 2. While the rings 40, 42 shown define a rectangular cross-section, the use of any number of cross-sections and/or dimensions of the rings 40, 42 may be used depending upon tire size and desired performance characteristics. The rings 40, 42 may extend completely between the tread base 34 and the tread surface 46, or only partially.

With the rings 40, 42 of the present invention, the tread 30 may exhibit directionally dependent stiffnesses. As an example, a tread 30 with the rings 40, 42 may exhibit a high modulus in the vertical or Z direction resulting from greatly reduced compressive strains in the Z direction. A tread 30 with the rings 40, 42 may also exhibit a reduced modulus in the circumferential or X direction and/or the lateral or Y direction due to the surrounding softer tread cap 32. This high modulus in the Z direction of the rings 40, 42 or combination of effects of the rings and the other structures of the tire 10 may thus result in significantly reduced rolling resistance (RR) of the tire 10 without significantly damaging other tire performance criteria.

Cyclic tread compressive strains may be significantly reduced by using a material/configuration with increased modulus in the thickness or Z direction. This results in reduced RR, attributable to the Z directed load-bearing actions and the associated reduction in deformation in the X and Y directions. Managing the simultaneous cyclic stress and strain cycles for reduced RR from all of these mechanisms may thus require a relatively high modulus in the Z direction with a relatively low modulus in the X and/or Y directions.

One method of obtaining these desired directional stiffness characteristics is to use a combination of materials within the tread. The Z directed stiffening may be achieved with relatively high modulus material 39 embedded within a relatively low modulus rubber matrix 36 with a unique geometry. For example, in accordance with the present invention, annular rings 40, 42 of high modulus material 39 extending substantially in the Z direction may resist Z directed stresses, while the surrounding tread cap material 36 interconnecting the rings may provide relatively low modulus properties in the X and Y directions.

Various configurations of the tread cap/tread base/ring combination of materials 36, 38, 39 may be implemented. Also, various orientations and/or cross-sections of the relatively high modulus rings 40, 42 may be implemented. For example, if a rectangular cross-section is oriented at 45 degrees relative to the circumferential or X direction (not shown), increased X or Y stiffness of the tread 30 may result. This may be desirable for improving cornering, braking/driving traction, etc. Calculations indicate that RR may be reduced by over 30% by Z oriented rings 40, 42 (FIGS. 1 & 2).

As discussed above, the overall performance of a given tread as to wet and dry handling or stopping/traction is often compromised by the stiffness, or lack of, for a given tread element. The desire to increase the stiffness of a tread element relies either on (1) providing a stiffer base material 38 to increase the stiffness of the overall tread or (2) a higher stiffness tread cap material 36, which may compromise other tread performance properties. In accordance with the present invention, the rings 40, 42 are formed of a higher stiffness material 39 buried within the individual tread elements or placed in various tread zones of the tire 10.

These rings 40, 42, or ridges or channels, of higher stiffness may consist essentially of various types of plastic or rigid materials, such as nylon, polyethylene, polyurethane, and/or a syndiotactic polybutadiene polymer ("SPBD"). SPBD may co-cure at the interface with the sulfur vulcanized diene based tread cap or tread base materials 36, 38 thereby securing the rings 40, 42 to the tread cap 32 and/or tread base 34. The placement of the rings 40, 42 may be performed by appropriate extrusion techniques and appropriate material selection for producing a green tread contour containing the rings of the high stiffness material 39 encapsulated within the outer more conventional stiffness tread cap material 36.

Additionally, electrical grounding may be provided by a so-called "chimney" in silica based tread compounds. The chimney may provide surface contact of a conductive compound for electrical grounding. These chimneys are conventionally very thin bands of highly conductive compounds (e.g., carbon black) within the tread cap to provide an electrical path for static charge conductivity from a vehicle to the ground. In accordance with the present invention, the above discussed extrusion approach may provide wider bands or ridges of stiff material 39 and appropriate positions within the tread elements (e.g., the shoulders 50, 52). Thus, for example, the higher stiffness, plastic-like rings 40, 42 may be disposed within the lesser stiffness tread cap elements of the shoulders 50, 52 thereby improving the side-to-side torque response of the shoulder tread elements and further improving handling performance and treadwear. The rings 40, 42, consisting essentially of SPBD and carbon black, may also conduct a static electrical charge and eliminate the requirement for the conventional conductive chimney.

As stated above, one example material 39 for the rings 40, 42 may be a SPBD with a melting point above 150 degrees Celsius. Further, the material 39 may be tested by a Rubber Process Analyzer, or "RPA," such as RPA 2000™ instrument by Alpha Technologies, formerly Flexsys Company and formerly Monsanto Company. References to an RPA 2000 instrument may be found in the following publications: H. A. Palowski, et al, *Rubber World, June* 1992 & January 1997, as well as *Rubber & Plastics News*, Apr. 26, 1993 & May 10, 1993. The RPA test results may be reported from data obtained at 100 degrees C. in a dynamic shear mode at a frequency of 11 hertz and at 10% dynamic strain values.

The Y-Z cross-section of the example rings 40, 42 may be a square, triangle, pentagon, hexagon, heptagon, octagon, nonagon, pentagon, or other suitable shape. The lateral or Y thickness of the example rings 40, 42 may also vary as the rings extend in the Z direction (e.g., a ring which narrows as it extends radially away from the wheel may be more securely attached to the tread than a ring with a thickness that does not vary). An example ring in accordance with the present invention may have a lateral or Y thickness W2 between 5 mm and 60 mm and a radial or Z length between 15 mm and 80 mm depending upon the tread size and configuration.

The harder SPBD material 39 may have a dynamic loss modulus between 1000 KPa and 8000 KPa, or between 1500 KPa and 5000 KPa. The softer tread cap material 32 may have a dynamic loss modulus between 250 KPa and 3000 KPa, or between 500 KPa and 2500 KPa. Further, the difference between the dynamic loss moduli of the ring material 39 and the tread cap material 32 may be greater than 500 KPa, or greater than 1000 KPa.

"Tan Delta" values determined at 10% strain may be a ratio of dynamic loss modulus to dynamic storage modulus and may be considered a measure of hysteresis wherein a lower hysteresis of a tread material 36, 38, and/or 39 may be desirable for lesser RR. A decrease in the Tan Delta value may correspond to a desirable decrease in hysteresis of the ring material 39. Thus, materials 39 for the rings 40, 42 may have a low Tan Delta and low hysteresis.

As stated above, the example material 39 for the rings 40, 42 may be SPBD. SPBD differs from other polybutadienes (e.g. differs from cis 1,4-polybutadiene rubber) in that SPBD has a vinyl 1,2-content of at least 80 percent which may vary from about 80 percent to at least about 96 percent. SPBD may be flexible, but is not generally considered an elastomer. Moreover, SPBD has little or no building tack for adhering to uncured conjugated diene-based rubber compositions, unless SPBD is first blended with one or more elastomers which ordinarily required an addition of a compatibilizer and perhaps a tackifying resin to do so.

Therefore, unwanted movement of the rings 40, 42 of SPBD may occur against an uncured rubber component during a tire building and forming process, unless the rings 40, 42 are at least partially pre-cured against a green rubber component prior to curing of the green tire. Rings 40, 42 of SPBD may provide the radial or Z direction stiffness discussed above. Thus, it may be desirable that no elastomer, compatabilizing agent, or tackifying resin be physically blended with the SPBD, unless used in very small amounts thereby not compromising the melting point of the SPBD.

SPBD may be a relatively rigid (limited flexibility) crystalline polymer with poor solubility in elastomers without the addition of a compatibilizer. For the present invention, as indicated above, SPBD may form the rings 40, 42, thereby providing some flexibility and not being blended with materials 36, 38 of the tread cap 32 and tread base 34, nor a compatibilizer. The melting point (MP) of SPBD may vary with the content of 1,2-microstructure. For example, MP values may range from about 120° C. at about an 80 percent vinyl 1,2-content up to about 200° C. to 210° C. for about a 96 percent vinyl 1,2-content for its microstructure.

For the present invention, SPBD may have a melting point (MP) temperature of at least 150° C., or from about 160° C. to about 220° C., so that the rings 40, 42 retain a significant degree of dimensional stability and thereby add stiffness and dimensional stability/support to the tread 30 at a relatively high temperature as the tread generates heat when being dynamically worked. Higher MP's may be preferred for the rings 40, 42. Further, the SPBD may contain a dispersion of one or more reinforcing fillers. In order to make the SPBD rings 40, 42 integral with the tread cap 32 and/or tread base 34, the rings may be co-cured with the sulfur curable tread cap and tread base. For such co-curing of the SPBD rings 40, 42, the interface between the rings and the tread cap 32 and/or tread base 34 may rely upon: (A) one or more sulfur curatives contained within the SPBD, (B) one or more sulfur curatives contained within tread cap and/or tread base, or (C) one or more sulfur curatives contained in each of the SPBD and tread cap 32 and/or tread base 34.

SPBD may be made integral with the tread cap 32 and/or tread base 34 by co-curing the SPBD and tread cap and/or tread base together at an elevated temperature in which the SPBD and tread cap and/or tread base may be integrated with each other at the interface between the SPBD and tread cap and/or tread base. Rings 40, 42 of SPBD may provide dimensional stability (e.g., a degree of rigidity) for the tread 30 by the integrated, co-cured ring/tread cap/tread base interface.

Further, it may not be desirable to blend the SPBD with other elastomers because such blending may dilute or degrade the dimensional stability of the SPBD rings 40, 42. In the above description, the term "phr" may mean "parts of material by weight per 100 parts by weight of rubber". The terms "rubber" and "elastomer" may be used interchangeably unless otherwise indicated. The terms "rubber composition" and "compound" may be used interchangeably unless otherwise indicated. The term "melting point, or "MP" as used herein may mean the melting temperature of the SPBD measured by conventional differential scanning calorimetry using a 10° C./minute temperature rise.

As stated above, a tread 30 with rings 40, 42 in accordance with the present invention produces excellent directional stiffness characteristics and electrical conductivity in a tread of a pneumatic tire 10. The rings 40, 42 thus enhance the performance of the pneumatic tire 10, even though the complexities of the structure and behavior of the pneumatic tire are such that no complete and satisfactory theory has been propounded. Temple, *Mechanics of Pneumatic Tires* (2005). While the fundamentals of classical composite theory are easily seen in pneumatic tire mechanics, the additional complexity introduced by the many structural components of pneumatic tires readily complicates the problem of predicting tire performance. Mayni, *Composite Effects on Tire Mechanics* (2005). Additionally, because of the non-linear time, frequency, and temperature behaviors of polymers and rubber, analytical design of pneumatic tires is one of the most challenging and underappreciated engineering challenges in today's industry. Mayni.

A pneumatic tire has certain essential structural elements. United States Department of Transportation, *Mechanics of Pneumatic Tires*, pages 207-208 (1981). An important structural element is the belt structure, typically made up of many cords of fine hard drawn steel or other metal embedded in, and bonded to, a matrix of low modulus polymeric material, usually natural or synthetic rubber. Id. at 207 through 208.

The cords are typically disposed as a single or double layer. Id. at 208. Tire manufacturers throughout the industry cannot agree or predict the effect of different twists of cords of the belt structure on noise characteristics, handling, durability, comfort, etc. in pneumatic tires, *Mechanics of Pneumatic Tires*, pages 80 through 85.

These complexities are demonstrated by the below table of the interrelationships between tire performance and tire components.

|  | LINER | CARCASS PLY | APEX | BELT | OV'LY | TREAD | MOLD |
|---|---|---|---|---|---|---|---|
| TREADWEAR |  |  |  | X |  | X | X |
| NOISE |  | X | X | X | X | X | X |
| HANDLING |  | X | X | X | X | X | X |
| TRACTION |  |  |  |  |  | X | X |
| DURABILITY | X | X | X | X | X | X | X |
| ROLL RESIST | X |  | X | X |  | X | X |
| RIDE COMFORT | X | X | X |  |  | X |  |
| HIGH SPEED |  | X | X | X | X | X | X |
| AIR RETENTION | X |  |  |  |  |  |  |
| MASS | X | X | X | X | X | X | X |

As seen in the table, the tread characteristics affect the other components of a pneumatic tire (i.e., the tread affects belt, etc.), leading to a number of components interrelating and interacting in such a way as to affect a group of functional properties (noise, handling, traction, durability, rolling resistance, comfort, high speed, and mass), resulting in a completely unpredictable and complex composite. Thus, changing even one component can lead to directly improving or degrading as many as the above ten functional characteristics, as well as altering the interaction between that one component and as many as six other structural components. Each of those six interactions may thereby indirectly improve or degrade those ten functional characteristics. Whether each of these functional characteristics is improved, degraded, or unaffected, and by what amount, certainly would have been unpredictable without the experimentation and testing conducted by the inventors.

Thus, for example, when the tread of a pneumatic tire is modified with the intent to improve one functional property of the pneumatic tire, any number of other functional properties may be unacceptably degraded. Furthermore, the interaction between the tread and the belt may also unacceptably affect the functional properties of the pneumatic tire. A modification of the tread may not even improve that one functional property because of these complex interrelationships.

Thus, as stated above, the complexity of the interrelationships of the multiple components makes the actual result of modification of a tread 30, in accordance with the present invention, impossible to predict or foresee from the infinite possible results. Only through extensive experimentation have the rings 40, 42 and tread 30 of the present invention been revealed as an excellent, unexpected, and unpredictable option for a pneumatic tire.

The previous descriptive language is of the best presently contemplated mode or modes of carrying out the present invention. This description is made for the purpose of illustrating an example of general principles of the present invention and should not be interpreted as limiting the present invention. The scope of the invention is best determined by reference to the appended claims. The reference numerals as depicted in the schematic drawings are the same as those referred to in the specification. For purposes of this application, the various examples illustrated in the figures each use a same reference numeral for similar components. The examples structures may employ similar components with variations in location or quantity thereby giving rise to alternative constructions in accordance with the present invention.

What is claimed:

1. A pneumatic tire comprising:
a tread base consisting of a first material;
a tread cap consisting of a second material, the tread cap being disposed radially outward of the tread base and in operational contact with a ground surface; and
two annular rings each consisting of a third material and each positioned in a shoulder portion of the tread cap, the rings each being disposed at least partially within the tread cap and extending radially away from the tread base, the rings both having a rectangular cross-section extending radially from the tread base to the ground surface, the rings having a stiffness in the radial direction greater than stiffnesses in the circumferential and lateral directions, the third material having a lower hysteresis than the second material during operation of the pneumatic tire, the third material further providing an electrical conductivity path to the ground surface, the third material consisting essentially of a syndiotactic polybutadiene polymer and carbon black.

2. The pneumatic tire as set forth in claim 1 wherein the third material has a higher modulus of elasticity than the second material.

3. The pneumatic tire as set forth in claim 2 wherein the third material has a higher modulus of elasticity than the first material.

4. The pneumatic tire as set forth in claim 1 wherein the third material has a dynamic loss modulus of between 1000 KPa and 8000 KPa.

5. The pneumatic tire as set forth in claim 1 wherein the third material has a dynamic loss modulus of between 1500 KPa and 5000 KPa.

6. The pneumatic tire as set forth in claim 1 wherein the second material has a dynamic loss modulus of between 250 KPa and 3000 KPa.

7. The pneumatic tire as set forth in claim 1 wherein the second material has a dynamic loss modulus of between 500 KPa and 2500 KPa.

8. The pneumatic tire as set forth in claim 1 wherein the difference between the dynamic loss moduli of the third material and the second material is greater than 500 KPa.

9. The pneumatic tire as set forth in claim 1 wherein the difference between the dynamic loss moduli of the third material and the second material is greater than 1000 KPa.

* * * * *